(12) United States Patent
Isomura

(10) Patent No.: US 7,822,744 B2
(45) Date of Patent: Oct. 26, 2010

(54) ALBUM CREATING APPARATUS, ALBUM CREATING METHOD AND COMPUTER READABLE MEDIUM

(75) Inventor: Ayumu Isomura, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 350 days.

(21) Appl. No.: 11/938,496

(22) Filed: Nov. 12, 2007

(65) Prior Publication Data

US 2008/0089592 A1   Apr. 17, 2008

Related U.S. Application Data

(63) Continuation of application No. PCT/JP2006/309776, filed on May 10, 2006.

(30) Foreign Application Priority Data

May 12, 2005   (JP)   ............................. 2005-139278

(51) Int. Cl.
*G06F 7/76* (2006.01)
*G06F 17/30* (2006.01)
(52) U.S. Cl. .............................. 707/731; 707/E17.018
(58) Field of Classification Search ...................... 707/1, 707/104.1, 999.001, 999.104, 705, 713, E17.08
See application file for complete search history.

(56) References Cited

U.S. PATENT DOCUMENTS

| | | | | |
|---|---|---|---|---|
| 5,841,904 | A * | 11/1998 | Sugiura | 382/233 |
| 6,636,648 | B2 * | 10/2003 | Loui et al. | 382/284 |
| 6,671,405 | B1 * | 12/2003 | Savakis et al. | 382/203 |
| 7,362,919 | B2 * | 4/2008 | Das et al. | 382/284 |
| 2002/0186412 | A1 * | 12/2002 | Murashita | 358/1.16 |
| 2004/0064339 | A1 * | 4/2004 | Shiota et al. | 705/1 |

FOREIGN PATENT DOCUMENTS

| | | | |
|---|---|---|---|
| JP | 10-126731 | A | 5/1998 |
| JP | 2003-58867 | A | 2/2003 |
| JP | 2003-058867 | A | 2/2003 |
| JP | 2004-222056 | A | 8/2004 |
| WO | 2004/055696 | A2 | 1/2004 |

* cited by examiner

*Primary Examiner*—James Trujillo
*Assistant Examiner*—Soheila Davanlou
(74) *Attorney, Agent, or Firm*—Sughrue Mion, PLLC

(57) ABSTRACT

An album creating apparatus for creating an album with an appropriate layout based on an image classification information and an image capturing time. The album creating apparatus according to an aspect of the invention includes: an image storage section that stores a plurality of images; an image classification information storage section that stores the image classification information in association with each of the images stored in the image storage section; a classification information importance calculating section for calculating the importance of the image classification information of the image stored in the image storage section; an image classification section that classifies the images stored in the image storage section based on the image classification information when the importance of the image classification information calculated by the classification information importance calculating section is higher than a predetermined reference value; a layout determining section that lays out the image classified by the image classification section into each region in an album; and a positional information inserting section for inserting into the layout region in which the image is laid out by the layout determining section, positional information indicative of the image classification information of the laid out image.

23 Claims, 10 Drawing Sheets

140

| POSITION | PERIOD | IMPORTANCE |
|---|---|---|
| LATITUDE ○○°○○'○○"<br>LONGITUDE △△°△△'△△" | MARCH 20TH<br>≀<br>APRIL 10TH | 10 |
| LATITUDE ××°××'××"<br>LONGITUDE □□°□□'□□" | — | 8 |
| ⋮ | ⋮ | ⋮ |

*FIG. 7*

ALBUM CREATING APPARATUS, ALBUM CREATING METHOD AND COMPUTER READABLE MEDIUM

CROSS REFERENCE TO RELATED APPLICATION

This is a continuation application of PCT/JP2006/309776 filed on May 10, 2006 which claims priority from a Japanese Patent Application No. 2005-139278 filed on May 12, 2005, the contents of which are incorporated herein by reference.

BACKGROUND

1. Technical Field

The present invention relates to an album creating apparatus, an album creating method, and a program. Particularly, the present invention relates to an album creating apparatus and an album creating method for creating an album, and a program for the album creating apparatus.

2. Related Art

There is a technology for creating an album that the map of travel destination is disposed at the center of a screen, images are disposed around the map based on tag information such as position information and image-capturing time information associated with image data captured in traveling, and the images and the image-capturing positions on the map are connected by lines, so that the relationship between the map and the images can be identified, for example as disclosed in Japanese Patent Application Publication No. 1998-126731.

However, the above-described technique can not create a desired album when a user wants to create an album to recode the growth of his/her child, for example. As for the album for recording the growth of a child, it is preferred that images are classified into pages in the order corresponding the date and time at which the image is captured so that the viewer can actually feel the growth of the child every time the viewer turns a page. Meanwhile, as for an album of the trip, it is preferred that images are classified into each of the places such as countries at which the image is captured. Here, if each national flag is disposed on each page classified into each country, an album which more satisfies the viewer can be obtained. However, in this case, the album creator has to determine whether images are classified based on the order corresponding the date and time or the image-capturing place, and judge which is country at which the image is captured each time. Therefore, it has needed a lot of times and works to create an album.

SUMMARY

Thus, an advantage of some aspects of the invention is to provide an album creating apparatus, an album creating method and a program which are capable of solving the problem accompanying the above-described technique. The above and other objects can be achieved by combining the features recited in independent claims. Then, dependent claims define further effective specific example of the present invention.

A first aspect of the present invention provides an album creating apparatus. The album creating apparatus includes: an image storage section for storing a plurality of images; an image classification information storage section for storing the image classification information of each image in association with the image classification information; a classification information importance calculating section for calculating the importance of the image classification information in the plurality of images stored in the image storage section; a image classification section for classifying the plurality of images stored in the image storage section based on the image classification information when the importance of the image classification information calculated by the classification information importance calculating section is higher than a predetermined reference value; and a layout determining section for laying out the images classified by the image classification section into each layout region in an album. The image classification information may include an image capturing position and/or an image capturing time. The image capturing position may include information that indicates a position where the image is captured. The image capturing time may include information that indicates a time when the image is captured. The album creating apparatus may further include a position information inserting section for inserting positional information indicative of the image capturing position of the laid out image.

The album creating apparatus further includes an image capturing position distribution calculating section of calculating the image capturing position distribution of the plurality of images stored in the image storage section. The classification information importance calculating section may calculate the importance of the image capturing positions in the plurality of images stored in the image storage section based on the image capturing position distribution calculated by the image capturing position distribution calculating section.

The classification information importance calculating section may calculate the importance higher when the image capturing position distribution calculated by the image capturing position distribution calculating section is unbalanced in two or more image capturing position and also when the distance between the disproportioned image capturing positions is larger.

The image classification section may classify the plurality of images in the image storage section based on the image capturing positions stored in the image classification information storage section into each page of the album. The layout determining section may lay out the images classified into each page by the layout determining section into each page of the album. The positional information inserting section may insert the positional information indicative of the image capturing position of the laid out image into the page in which the image is laid out by the layout determining section.

The album creating apparatus further includes an image capturing time storage section for storing each time at which the image is captured in association with each of the plurality of images stored in the image storage section, a time importance calculating section for calculating the importance of the image capturing time of the plurality of image stored in the image storage section, and a time information inserting section for inserting time information indicative of the image capturing time of the laid out image into a layout region in which the image is laid out by the layout determining section. The image classification section may classify the plurality of images stored in the image storage section further based on the image capturing time when the importance of the image capturing time calculated by the time importance calculating section is higher than the predetermined reference value. The time information inserting section may further insert the time information indicative of the image capturing time of the laid out image into the layout region laid out by the layout determining section.

The album creating apparatus further includes a focal distance storage section for storing each focal distance for which the image is captured in association with each of the plurality of images stored in the image storage section, an image capturing target area identifying section for identifying each image capturing target area of the plurality of images stored in the image classification information storage section based on the image capturing positions of the plurality of images stored in the image classification information storage section and the plurality of focal distances stored in the focal distance storage section and a important subject area judgment section for judging whether the image capturing target area identified by the image capturing target area identifying section includes the position of the important subject stored in the important subject position storage section to store the position of the important subject previously registered as an image capturing target. The classification information importance calculating section may calculate higher the importance of the image capturing positions of the plurality of images stored in the image storage section when the image storage section stores more images judged by the important subject area judgment section as that the image capturing target area includes the position of the important subject.

The album creating apparatus further includes an image capturing direction storage section for storing the image capturing direction in association with each of the plurality of images stored in the image storage section. The image target area identifying section may identify the image capturing target area for each of the plurality of images stored in the image classification information storage section.

The album creating apparatus further includes an image capturing time storage section for storing the image capturing time in association with each of the plurality of images stored in the image storage section, respectively. The important subject position storage section may stores the position of the important subject in association with the period. The important subject area judgment section determines whether the capturing target area for the image identified by the image capturing target area identifying section includes the position of the important subject stored in the image capturing time storage section in association with the period including the capturing time for the image stored in the image capturing time storage section. The classification information importance calculating section may calculate higher the importance of the image capturing position of the plurality of images stored in the image storage section when the image storage section stores a larger number of images judged that it includes the position of the important subject by the important subject area judgment section.

The album creating apparatus further includes an area dividing section for dividing the image capturing range for the plurality of images stored in the image storage section into a plurality of areas, an image capturing time storage section for storing the image capturing time in association with each of the plurality of images stored in the image storage section, respectively, and an image capturing time judgment section for judging whether the image storage section stores the image captured in a second area divided by the area dividing section at the time in the period for which the plurality of images are captured in a first area divided by the area dividing section based on the image capturing positions of the plurality of images stored in the image storage section and the image capturing times of the plurality of images stored in the image capturing time storage section, respectively. The classification information importance calculating section may calculate lower the importance of the image capturing positions of the plurality of image classification information storage section when the image capturing time judgment section judges that the image storage section stores the image captured in the second area at the time between the image capturing times at which the plurality of images are captured in the first area.

A second aspect of the present invention provides an album creating method. The album creating method includes the steps of: storing a plurality of images; storing the image classification information of each image in association with the plurality of images stored in the image storing step; calculating the importance of the image classification information of the plurality of images stored in the image storage step; classifying the plurality of images stored in the image storage step based on the image classification information when the importance of the image classification information calculated in the classification information importance calculating step is higher than a predetermined reference value; and laying out the images classified in the image classifying step into each layout region in an album.

A third aspect of the present invention provides a computer readable medium storing thereon a program for an album creating apparatus for creating an album. The program operates the album creating apparatus to function as: an image storage section for storing a plurality of images; an image classification information storage section for storing the image classification information of each image in association with the image classification information; a classification information importance calculating section for calculating the importance of the image classification information in the plurality of images stored in the image storage section; a image classification section for classifying the plurality of images stored in the image storage section based on the image classification information when the importance of the image capturing position calculated by the classification information importance classification information is higher than a predetermined reference value; and a layout determining section for laying out the images classified by the image classification section into each layout region in an album.

Here, all necessary features of the present invention are not listed in the summary of the invention. The sub-combinations of the features may become the invention.

According to an aspect of the invention, an album with the appropriate layout based on the image capturing position or the image capturing time can be provided.

BRIEF DESCRIPTION OF THE DRAWINGS

FIG. 7 shows an example of data stored in an important subject position storage section 140.

DESCRIPTION OF EXEMPLARY EMBODIMENTS

Hereinafter, the present invention will now be described through some embodiments. The embodiments do not limit the invention according to claims and all combinations of the features described in the embodiments are not necessarily essential to means for solving the problems of the invention.

Figure 1:
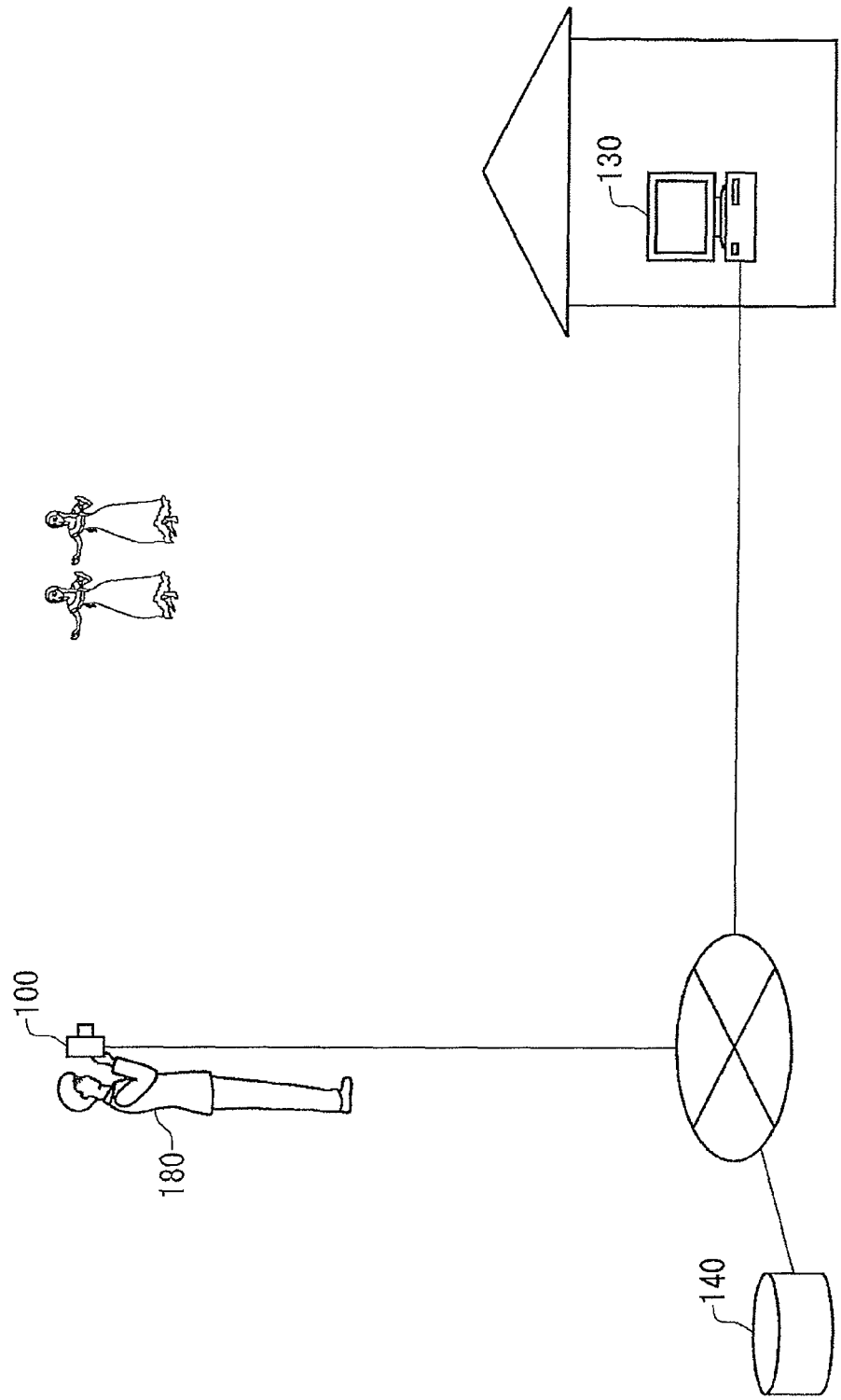
FIG. 1 shows an example of the environment for the usage of an album creating system 170.

FIG. 1 shows an example of the environment for the usage of an album creating system 170 according to an embodiment of the present invention. The album creating system 170 includes an image capturing apparatus 100 and an album creating apparatus 130. Capturing an image, the image capturing apparatus 100 records the image capturing position as tag information of the captured image by tagging the image capturing position to the image. For example, the image capturing apparatus 100 captures the image at the timing at which a user 180 pushes down a release button. Additionally, the image capturing apparatus 100 records latitude and longitude information on the position of image capturing apparatus 100, which are acquired from Global Positioning System satellite at the timing at which the user 180 pushes the release button as the image capturing position.

Then, the album creating apparatus 130 receives the image from the image capturing apparatus 100 through a communication line 150 such as Internet and a local area wireless network, or a recording medium such as a semiconductor memory and a CD-ROM. Then, the album creating apparatus 130 selects an image among the images received from the image capturing apparatus 100, lays out the same and outputs as an album on a printer and a display.

The album creating apparatus 130 allocates images into each page in the album such that the images captured at the times close each other or at the position close each other are stored in a page of the album. At this time, when the image capturing positions at which the images are captured are disproportionally distributed, the album creating apparatus 130 allocates the images into each page such that the images captured at close positions are the same page and inserts page titles indicative of the image capturing position into each page. Meanwhile, when the image capturing times are the album creating apparatus 130 are disproportionally distributed, the album creating apparatus 130 allocates the images into each page such that the images captured at close times are the same page and inserts page titles indicative of the image capturing time into each page.

Here, the album creating apparatus 130 may be an apparatus for creating an album including a plurality of images and printing the same and also may be an apparatus for simultaneously displaying a plurality of images on a screen. For example, the album creating apparatus 130 may be a personal computer, an electronic album, a HDTV and a printer. Meanwhile, the image capturing apparatus 100 may be a digital still camera, a camera cell-phone and a handheld terminal having an image capturing function such as a PDA.

According to the above-described album creating system 170, the image capturing apparatus 100 records the image capturing position and the image capturing time, and the album creating apparatus 130 allocate the images captured the close positions or the close times to the same page, so that the album creating system 170 can create an album without feeling uncomfortable by the viewer. Additionally, the album creating apparatus 130 can insert the title indicative of the image capturing position and the image capturing time into each page so that the viewer can remember the memory when the image was captured as viewing the album. Therefore, the user 180 can obtain the album without classifying images and having any work to lay out images.

Figure 2:
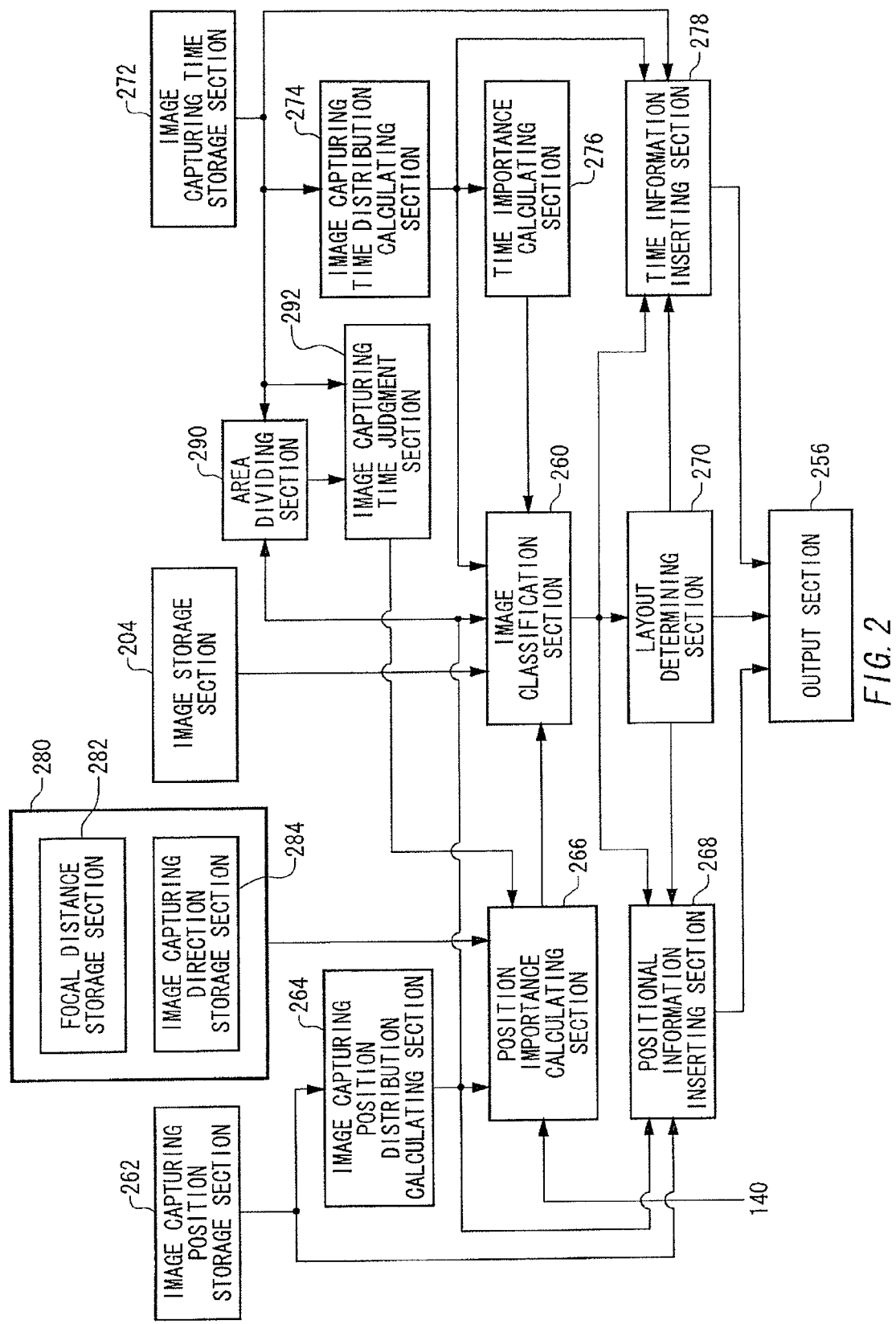
FIG. 2 shows an example of a block configuration of an album creating apparatus 130.

FIG. 2 shows an example of a block configuration of an album creating apparatus 130. The album creating apparatus 130 includes an image capturing section 204, an image classification section 240, an image capturing position storage section 262, an image capturing position distribution section 270, an image capturing time storage section 272, an image capturing time distribution calculating section 274, a time importance calculating section 276, a time information inserting section 280, a focal distance storage section 282, an image capturing direction storage section 284, an area dividing section 282 and an image capturing direction storage section 284. The position importance calculating section 266 includes an image capturing target area identifying section 240 and an important subject area judgment section 250. The image capturing position storage section 262 is one example of an image classification information storage section. The position importance calculating section 266 is one example of a classification information importance calculating section.

The image storage section stores a plurality of images. The image capturing position storage section 262 stores the image capturing position in association with each of the plurality of images stored in the image storage section 204. The image capturing position distribution calculating section 264 calculates the image capturing position distribution of the plurality of images stored in the image storage section 204.

The position importance calculating section 266 calculates the importance of the image capturing positions of the plurality of images stored in the image storage section based on the image capturing positions of the plurality of images stored in the image storage section 204. Specifically, the position importance calculating section 266 calculates the image capturing positions of the plurality of images stored in the image storage section based on the image capturing position distribution calculated by the image capturing position distribution section 264. Further specifically, the position importance calculating section 266 calculates higher importance when the image capturing position distribution calculated by the image capturing position distribution calculating section 264 is unbalanced in two or more image capturing positions and also when the distance between the concentrated image capturing positions are larger.

The image classification section 260 lays out the images classified by the image classification section 260 into each layout region. Specifically, the layout determining section 270 lays out the image classified into each page by the image classification section 260 into each page in the album. Here, a page is an example of a layout region. The layout region may be a facing page, a plurality of pages and a part of region in one page. Additionally, when the album creating apparatus 130 outputs the album to a display device, the layout region may be a display region on which images are simultaneously displayed by the display device and also may be a part of the display region.

The positional information inserting section 268 inserts positional information indicative of the image capturing position of the laid out image in the layout region in which the images are laid out by the layout determining section 270. Specifically, the positional information inserting section 268 inserts the positional information indicative of the image capturing position of the laid out image to the page in which the images are laid out by the layout determining section 270. The positional information may be any character indicative of the position of the image capturing region such as a country at which the image is captured, and also may be any design indicative of the image capturing region such as the national flag and the map.

Therefore, the album creating apparatus 130 can classify images into a page based on the image capturing position and insert the title indicative of the image capturing position to each page when an album such as an album of the trip is created from a image group in which the image capturing positions are disproportionally distributed. Thus, the user 180 can easily obtain the album in which pages are appropriately allocated by using the album creating apparatus 130.

The image capturing time storage section 272 stores the image capturing time in association with each of the plurality of images stored in the image capturing section 204, respectively. The image capturing time distribution calculating section 274 calculates the image capturing time distribution of the plurality of images stored in the image storage section 204 based on the image capturing positions of the plurality of images stored in the image capturing time storage section 272.

The time importance calculating section 276 calculates the importance of the image capturing time of the plurality of images stored in the image storage section 204. Specifically, the time importance calculating section 276 calculates the importance of the image capturing time of the plurality of images stored in the image storage section 204 based on the image capturing time distribution calculated by the image capturing time distribution calculating section 274. Further specifically, the time importance calculating section 276 calculates higher importance when the image capturing time distribution calculated by the image capturing time distribution calculating section 274 is unbalanced in two or more image capturing times and also when the distance between the concentrated image capturing times.

The image classification section 260 classifies the plurality of images stored in the image storage section 204 further based on the image capturing time when the importance of the image capturing time calculated by the time importance calculating section 276 is higher than a predetermined reference value. The time information inserting section 278 further inserts time information indicative of the capturing time of the laid out image to a layout region in which the image is laid out by the layout determining section 270. Specifically, the time information inserting section 278 inserts the time information indicative of the time at which the laid out image is captured to the page in which the image is laid out by the layout determining section 270. The time information may be any character indicative of the period including the image capturing time such as the date. Additionally, the time information may be any character indicative of information which changes with time such as the age of the subject. Further, the time information may be any design indicative of the period including the image capturing time such as a chronological table.

Here, the image classification section 260 may classify the plurality of images stored in the image storage section 204 when the importance of the image capturing time calculated by the time importance calculating section 276 is higher than a predetermined reference value. Then, the layout determining section 270 may lay out the image classified by the image classification section 260 to each layout region in the album. Then, the time information inserting section 278 may insert the time information indicative of the time at which the laid out image is captured.

The focal distance storage section 282 stores the focal distance at which the image is captured in association with each of the plurality of images stored in the image storage section 204. Then, the image capturing target area identifying section 240 identifies the image capturing target area for each of the plurality of images stored in the image capturing position storage section 262, respectively. Then, the important subject area judgment section 250 judges whether the image capturing target area identified by the image capturing target area identifying section 240 includes the position of the important subject which is previously registered and stored in the important subject position storage section. Then, the position importance calculating section 266 calculates higher the importance of the image capturing position of the plurality of images stored in the image storage section 204 when the image storage section stores more images judged by the important subject area judgment section 250 as that the image capturing target area includes the position of the important subject.

Here, the image capturing direction storage section 284 stores the direction to which the image is captured in association with each of the plurality of images stored in the image storage section 204. Then, the image capturing target area identifying section 240 identifies the image capturing target area for each of the plurality of images stored in the image capturing position storage section 262 further based on the plurality of the image capturing directions stored in the image capturing direction storage section 284. Therefore, the position importance calculating section 266 can calculate higher the importance of the image captured from the position at which the important target subject can be captured.

Here, the important subject position storage section 140 stores the position of the important subject in association with the period. Then, the important subject area judgment section 250 judges whether the image capturing target area of the image identified by the image capturing target area identifying area 240 includes the position of the important subject stored in the important subject position storage section 140 in association with the period including the time at which the image stored in the image capturing time storage section 272 is captured. Then, the position importance calculating section 266 calculates higher the importance of the image capturing positions of the plurality of images stored in the image storage section 204 when the image storage section 204 stores more images judged by the important subject area judgment section 250 as that the image includes the position of the main subject. Therefore, the position importance calculating section 266 can judge that the image of a row of cherry blossom trees captured in spring is more important than the image of a row of cherry blossom trees captured in the other seasons because the cherry blossom is a vernal flower.

The area dividing section 290 divides the image capturing range for the plurality of images stored in the image storage section 204 based on the image capturing positions of the plurality of images stored in the image capturing position storage section 262. The image capturing time judgment section 292 judges whether the image captured in the second area divided by the area dividing section 290 at the time between the image capturing times at which the plurality of images captured in the first area divided by the area dividing section 290 based on the plurality of image capturing times stored in the image capturing position storage section 262 and the plurality of image capturing times stored in the image capturing time storage section 272. Then, the position importance calculating section 266 calculates lower the importance of the plurality of image capturing positions stored in the image capturing position storage section 262 when the image capturing time judgment section 292 judges that the image storage section 204 stores the image captured in the second area at the times among the image capturing time at which the plurality of images captured in the first area are captured.

The above-described album creating apparatus 130 can automatically create the album with the layout based on the image capturing position and/or the image capturing time. Then, the user 180 can easily obtain an album of the trip in which images is classified into each page based on the sightseeing spot and an album of the growth in which the images including the record of the growth of a child are classified for each page based on the season by using the album creating apparatus 130. Additionally, the album creating apparatus 130 can automatically insert the page title suitable for indicating each sightseeing spot and the page title suitable for indicating the image capturing time to each page.

Figure 3:
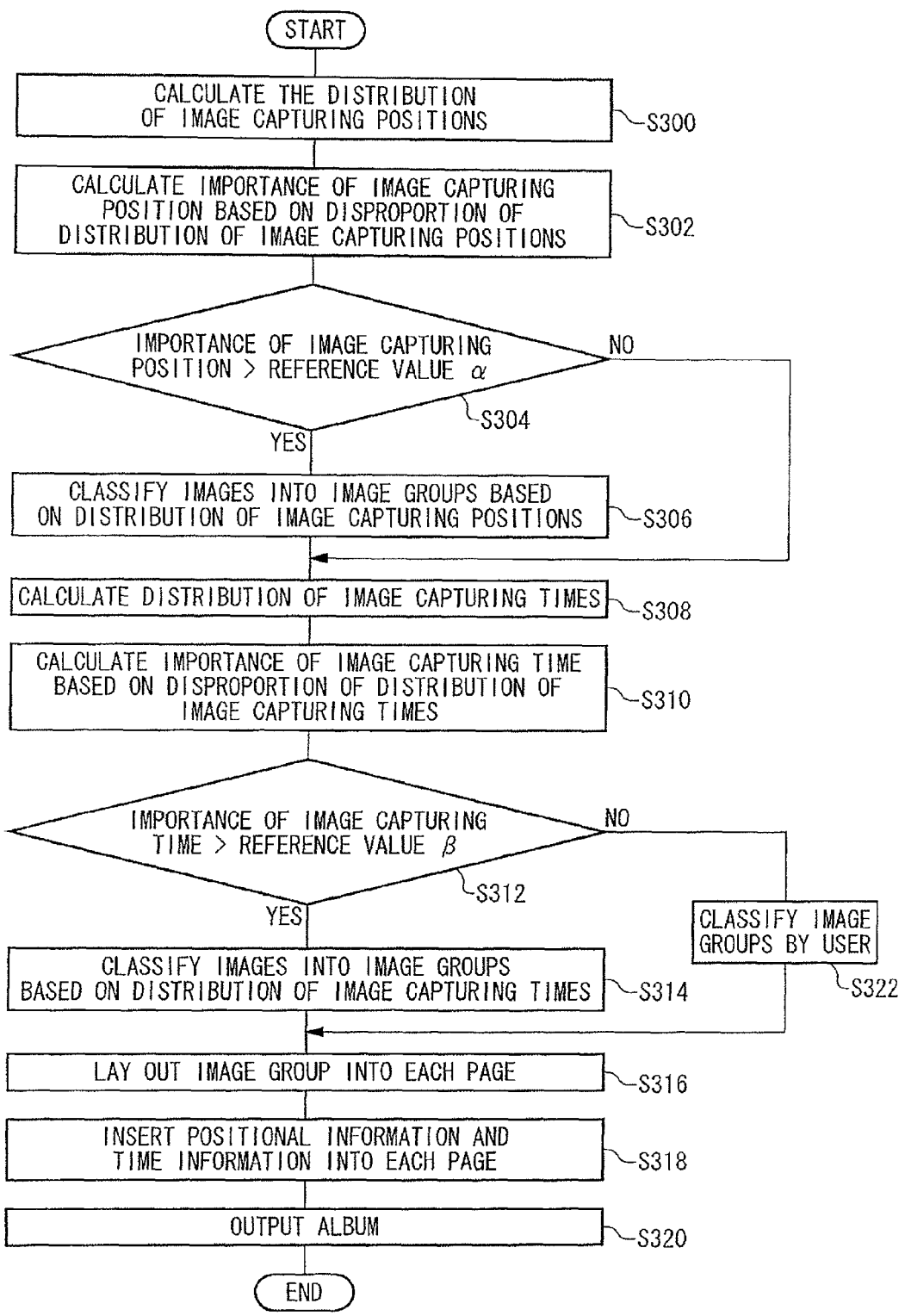
FIG. 3 is an example of a flowchart of creating an album by the album creating apparatus 130.

FIG. 3 is an example of a flowchart of creating an album by the album creating apparatus 130. The image capturing position distribution calculating section 264 calculates the distribution of the image capturing positions based on the image capturing position tagged to each image as tag information (S300). Then, the position importance calculating section 266 calculates the disproportion of the image capturing positions based on the distribution of the image capturing positions calculated in the S300 and calculates the importance of the image capturing position based on the disproportion (S302).

Then, the image classification section 260 determines whether the importance of the image capturing position calculated in S302 is larger than a reference value α (S304). When the importance of the image capturing position is larger than the reference valued in the S304, the image classification section 260 classifies images into image groups based on the distribution of the image capturing positions (S306).

The image capturing time distribution calculating section 274 calculates the distribution of the image capturing times based on the image capturing times tagged to each image as tag information (S308). Then, the time importance calculating section 276 calculates the disproportion of the distribution of the image capturing times from the distribution of the image capturing times calculated in the S308 and then, calculates the importance of the image capturing time based on the disproportion (S310).

The Image classification section 260 judges whether the importance of the image capturing time calculated in the S302 is larger than a reference value β. When the importance of the image capturing time is larger than the reference value β in the S312, the image classification section 260 classifies images into image groups based on the distribution of the image capturing times (S314). Here, the image classification section 260 further classifies the image groups classified based on the distribution of the image capturing positions when the images area classified into the image group based on the distribution of the images in the S306.

Then, the layout determining section 270 allocates the image group classified by the image classification section 260 to each page and lays out the images of the image group allocated to each page into each page (S316). Then, the positional information inserting section 268 inserts the positional information into each page, and the time information inserting section 278 inserts the time information into each page (S318). Then, the output section 256 outputs album data and ends the process.

Here, when the importance of the image capturing position is less than the reference value α in the S304, the S306 is skipped and the process is shifted to S308. Additionally, the importance of the image capturing time is less than the reference value β, the images are classified into an image group by the user 180 (S322), and the process is shifted to the S316. Here, in the S322, the album creating apparatus can cause the user to select a classification into the image group based on the image capturing position of a classification in to the image group based on the image capturing time. Additionally, the album creating apparatus 130 may receive the information indicative of the image group classified by the user 180.

Figure 4:
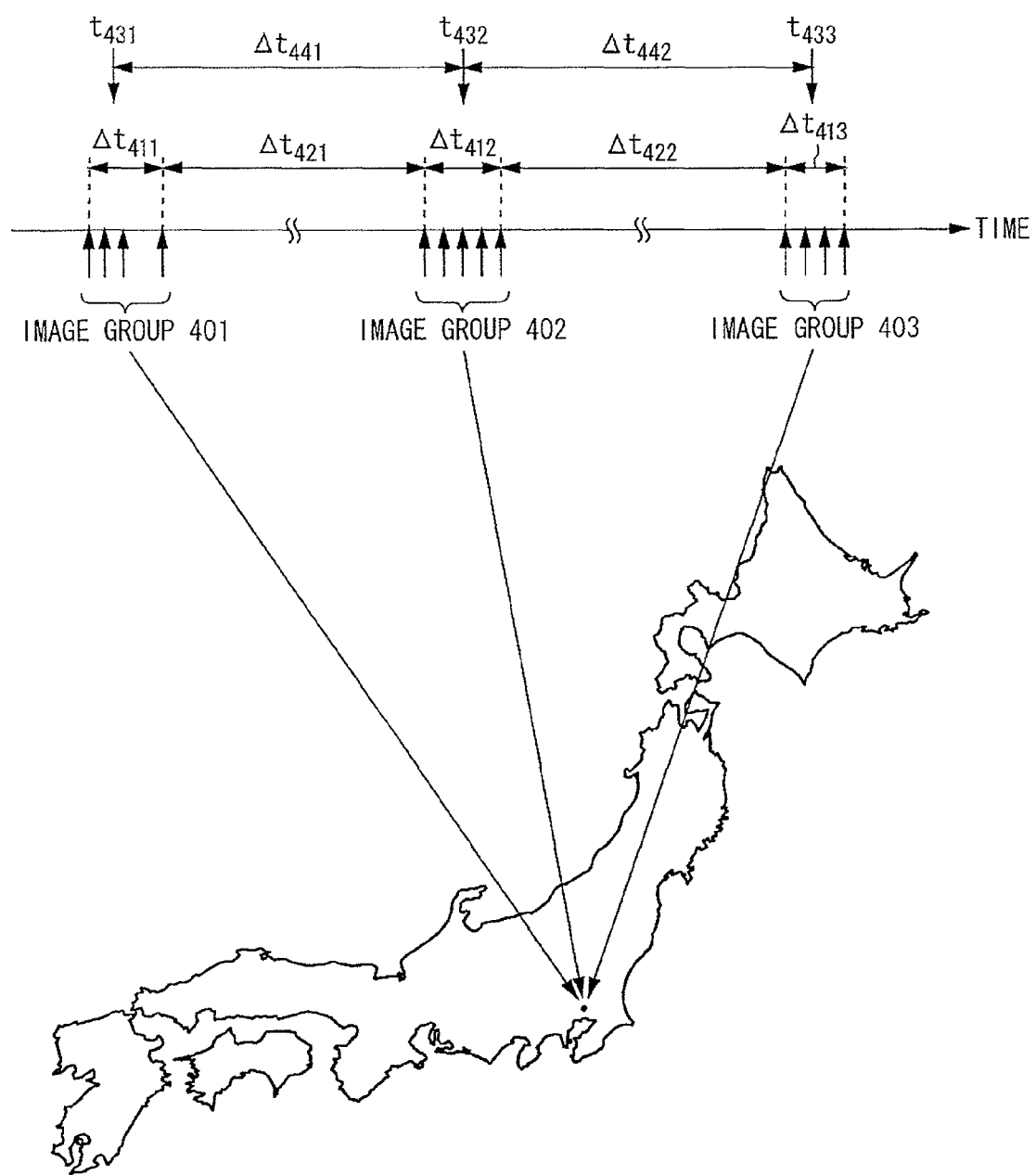
FIG. 4 is an example of determining the importance of an image capturing time.

FIG. 4 is an example of determining the importance of an image capturing time. The image capturing time distribution calculating section 274 calculates a value obtained by dividing the total number of images used for the album which are stored in the image storage section by the total number of the album to be created as the number of images per page. Then, the image capturing time distribution calculating section 274 calculates the image capturing distance indicative of the difference between the image capturing time of the image and the image capturing time of the image captured immediately before that for each image. Then, the image capturing time distribution section 274 selects sequentially the largest image capturing period and selects an image group including the images captured at the time before the selected image capturing period. Then, the image capturing time distribution calculating section 274 selects the image group in descending order of the image capturing distance such that the number of the selected image group is approximately the same as the number of images per page and extracts the number of image group equal to the number of pages of the album to divide the image group. Then, the image capturing time distribution calculating section 274 counts the number of images included in each of the extracted image groups to calculate the distribution of the image capturing times.

Then, the time importance calculating section 276 calculates the average value of the image capturing period for each divided image groups. Specifically, the time importance calculating section 276 calculates a value obtained by dividing the difference between the latest image capturing time and the oldest image capturing time among the image capturing times included in the same image group by the value obtained by subtracting one from the number of images in the image group for each image group as an image capturing distance average value of the image group. For example, in an image group 401, the image capturing distance average value of the image group is $\Delta t411/3$. Then, the time importance calculating section 276 calculates the average value for each image group of the image capturing distance average value for each image group as the image capturing distance average value in the image group.

Additionally, the time importance calculating section 276 calculates the average value of the image capturing period between the image groups as the image capturing distance average value between the image groups. For example a shown in FIG. 4, the image capturing distance average value between the image groups is $(\Delta t421+\Delta t422)/2$. Additionally, the time importance calculating section 276 may calculate average value t431, t432 and t433 of the image capturing time for each image group and determine that the average value $(\Delta t441+\Delta t442)/2$ is the image capturing period average value between the image groups.

Then, the time importance calculating section 276 calculates the value obtained by dividing the image capturing distance average value between the image group by the average value of the image capturing distance in the image group as the disproportion of the image capturing time. Then, the time importance calculating section 276 calculates the value obtained by dividing the disproportion of the image capturing times by a predetermined reference value for the disproportional as the importance of the image capturing time. As shown in FIG. 4, it is calculated such that the longer the image capturing distance average value between the image groups to the image capturing distance average value is, the more disproportionally the image capturing times are distributed, so that the importance of the image capturing time is calculated higher.

Then, as shown in FIG. 4, images in an image group 401, an image group 402 and an image group 403 which are captured at the image capturing times close each other area allocated to the same page, respectively. As described above, the album creating apparatus 130 can appropriately allocate images to each page based on the image capturing time. Accordingly, the album creating apparatus 130 can automatically create an album classified to each page in the order corresponding to the image capturing times.

Figure 5:
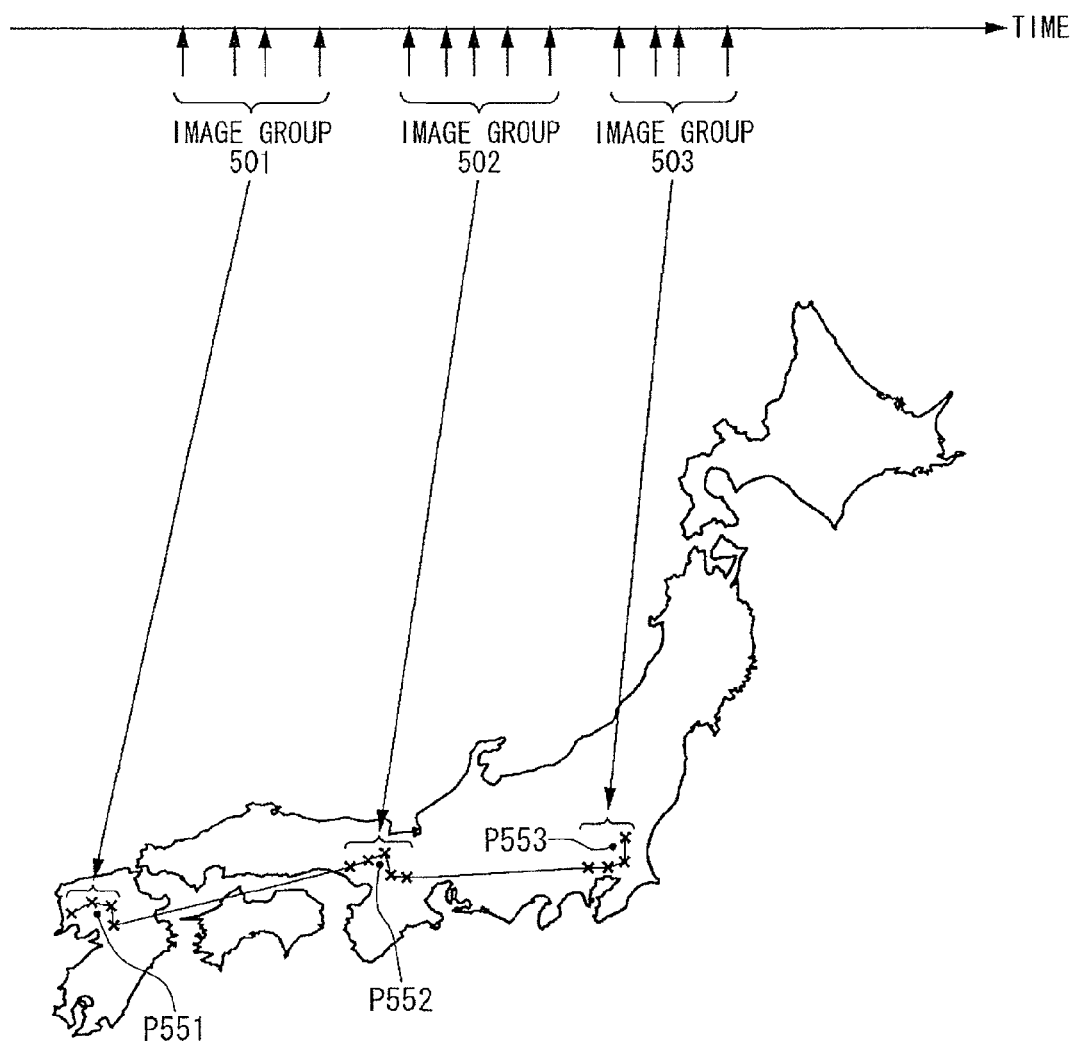
FIG. 5 shows an example of classifying into image groups depending on the image capturing position.

FIG. 5 shows an example of classifying into image groups depending on the image capturing position. The image capturing position distribution calculating section 264 calculates a value obtained by dividing the total number of images used for the album which are stored in the image storage section 204 by the total number of pages of the album to be created as the number of images per page. Then, the image capturing position distribution calculating section 254 calculates the distance between the moving distance indicative of the difference between the position at which an image is captured and the image capturing position of the image captured immediately before that. Then, the image capturing time distribution calculating section 274 selects the image group including the images captured at the time before the time at which the image is captured by the moving distance. Then, the image capturing position distribution calculating section 264 divides the image group and selects the same such that the number of selected image groups is approximately same as the number of images per one page to extract the image groups for the number of album. Then, the image capturing position distribution calculating section 264 counts the number of images included each of the divided image groups to calculate the distribution of the image capturing position.

Then, the position importance calculating section 266 calculates the average value of the moving distance for each of the divided image groups. Then, the position importance calculating section 266 calculates the average value of the moving distance for each image group as the moving distance average value for the image group.

Additionally, the position importance calculating section 266 calculates the central coordinate (P511, P552 and P553) of the image capturing position of the plurality of images for each extracted image group. Then, the position importance calculating section 266 finds the distance between the central coordinate for each image group as the moving distance between the image groups. Then, the position importance calculating section 266 calculates the average value of the moving distance between the image group as the moving distance average value between the image groups. Then, the time importance calculating section 276 calculates a value obtained by dividing the moving distance average value between the image groups by the moving distance average value in the image group as the disproportion of the image capturing positions. Then, the position importance calculating section 266 calculates the value obtained by dividing a predetermined reference value of the disproportion as the importance of the image capturing position. As shown in FIG. 5, it is calculated such that the larger the average value of the moving distance between the image groups is, the more disproportionally the image capturing positions are distributed, so that the importance of the image capturing position is calculated higher.

Then, as shown in FIG. 5, the image classification section 260 classifies images in an image group 501, an image group 502 and an image group 503 which are captured at the positions close each other based on the image capturing position distribution to the same page, respectively. As described above, the album creating apparatus 130 can appropriately allocate the images based on the image capturing position. Therefore, the album creating apparatus 130 can automatically create the album in which pages classified in the order corresponding to the image capturing positions when an album of the trop is created while the user 180 moves among each sightseeing spot, for example.

Figure 6:
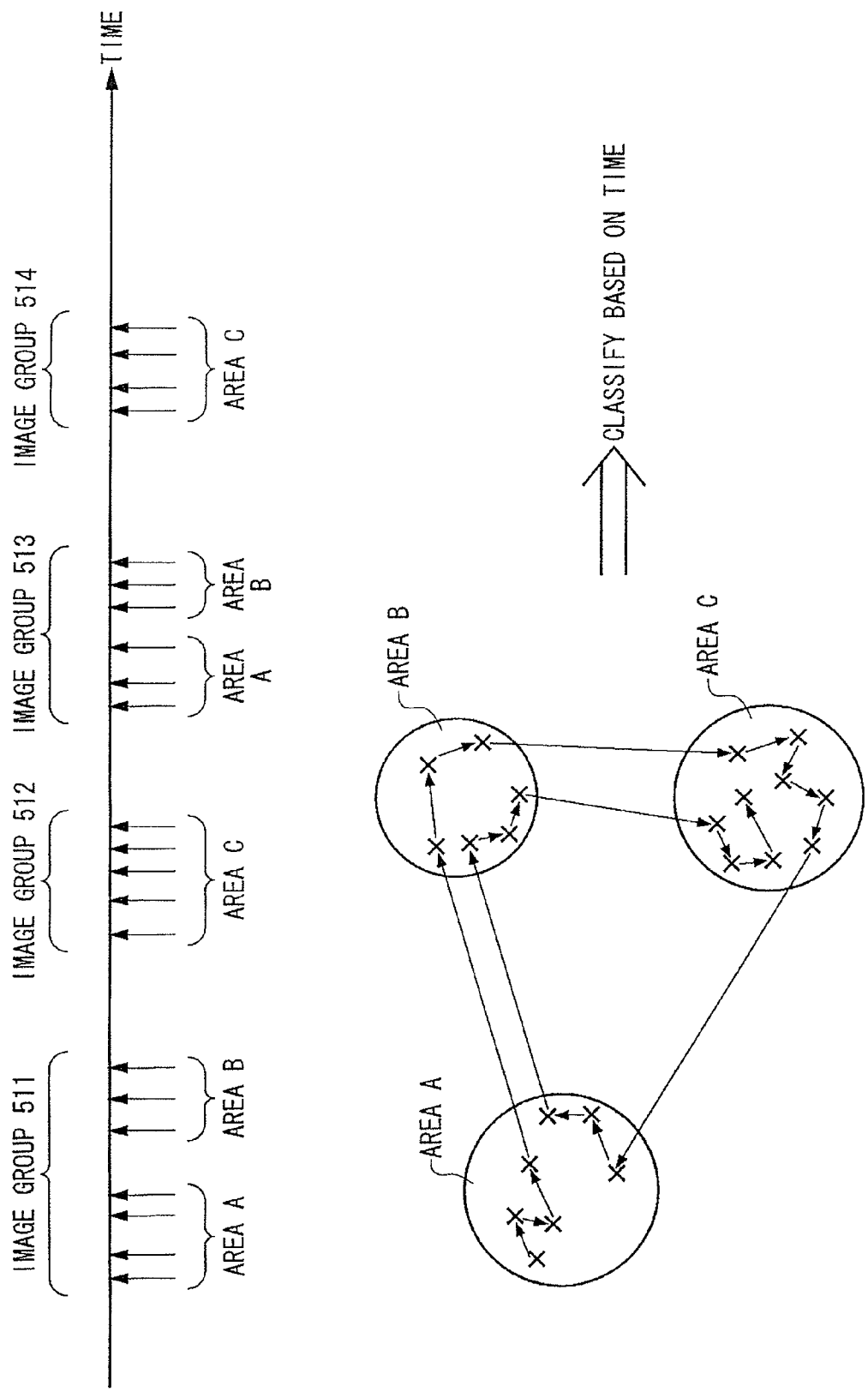
FIG. 6 shows another example of classifying images.

FIG. 6 shows another example of classifying images. As shown in FIG. 6, images are captured such that four sheets, three sheets, five sheets, three sheets, three sheets and four sheets are captured in an area A,B,C,A,B and C in the order corresponding to that, respectively. The areas A,B,C are classified by the area dividing section 290. Here, the area dividing section 290 may determine the area in which the image capturing positions are disproportioned based on the image capturing position calculated by the image capturing position distribution calculating section 264. For example, the area dividing section may determine the range for a plurality of areas such that the density ratio indicative of the number of images captured in the area to the area is more than a predetermined density. Additionally, the area dividing section 290 may previously store a plurality of areas to be classified in association with the position included in the area. Then, the area dividing section 290 may allocate the images to area including the image capturing positions stored in the image capturing position storage section 262 to divide the image capturing rage of the plurality of images stored in the image storage section 204 into a plurality of areas.

Then, the image capturing time determining judgment section 292 judges whether any image is captured in the other areas at the time in the period for which the images are captured in the same area. As shown in FIG. 6, images are captured in the area B and C at the time in the period for which the images are captured in the area A. In this case, the position importance calculating section 266 subtracts a predetermined value from the importance of the image capturing position obtained by calculating the disproportion of the image capturing positions in the S302 of FIG. 3.

Here, the image capturing time judgment section 292 may judge the number of areas captured in the other areas or the number of images captured in the other areas at the times in the period for which the images are captured in the same area. Then, the position importance calculating section 266 may calculate the importance of the image capturing position when the number of areas or the number of images which are calculated by the image capturing time judgment section 292 is larger. Additionally, the image capturing time judgment section 292 may calculate the degree of scattering in the order corresponding to the arrangement of the areas regarding the time axis when the areas in which the images area captured are arranged in chronological order. Then, when the degree of scattering calculated by the image capturing time judgment section 292 is larger, the position importance calculating section 266 may calculate lower the importance of the image capturing position. Additionally, the image capturing time judgment section 292 may judge whether a certain arrangement order is repeated times more than a predetermined times when the areas are arranged in chronological order. Then, the position importance calculating section 266 may subtract the predetermined value from the importance of the image capturing position when the certain arrangement order is repeated times more than a predetermined times.

As described above, the position importance calculating section 266 calculates lower the importance of the position when the areas captured by the user using the image capturing apparatus 100 are randomly distributed in terms of time. Then, the image classification section 260 may classify images based on the distribution of the image capturing positions if the importance of the time calculated by the time importance calculating section 276 is higher than the importance of the image capturing position calculated by the image capturing position distribution calculating section 264. As shown in FIG. 6, the image classification section 260 classifies the images into an image groups 511, 512, 513 and 514 based on the distribution of the image capturing positions as the result that the importance of the image capturing time is calculated lower.

FIG. 7 is a table showing an example of data stored in an important subject position storage section 140. The important subject position storage section 140 stores the position of the important subject, the period for which for which the important subject is regarded as important. For example, the important subject position storage section 140 stores the longitude and latitude indicative of the representative position of the important subject as the position of the important subject. Additionally, the important subject position storage section 140 stores the period for which the important subject is regarded as important. For example, the important subject position storage section 140 stores the period for which cherry blossoms are opened in association with a major cherry blossom-viewing spot. Here, the important subject position storage section 140 may store the null value for the period if the important subject is important independent of the period. Additionally, the important subject position storage section 140 stores the importance of the important subject regarding the position and the period. Here, the important subject position storage section 140 may store the importance of one important subject in association with each of a plurality of combinations of the positions and the periods.

In FIG. 7, it has been described that the important subject position storage section 140 stores the longitude and latitude indicative of the representative point of the important subject as the position of the important subject, for example. However, the important subject position storage section 140 may store the range including the position of the important subject as the position of the important subject. For example, the important subject position storage section 140 may store the range including the position of the important subject by storing the longitude and latitude indicative of each of the opposing corners of a rectangle. Additionally, the important subject position storage section 140 may store the range including the position of the important subject by storing vector information connecting a plurality of points indicated by the longitude and latitude.

Figure 8:
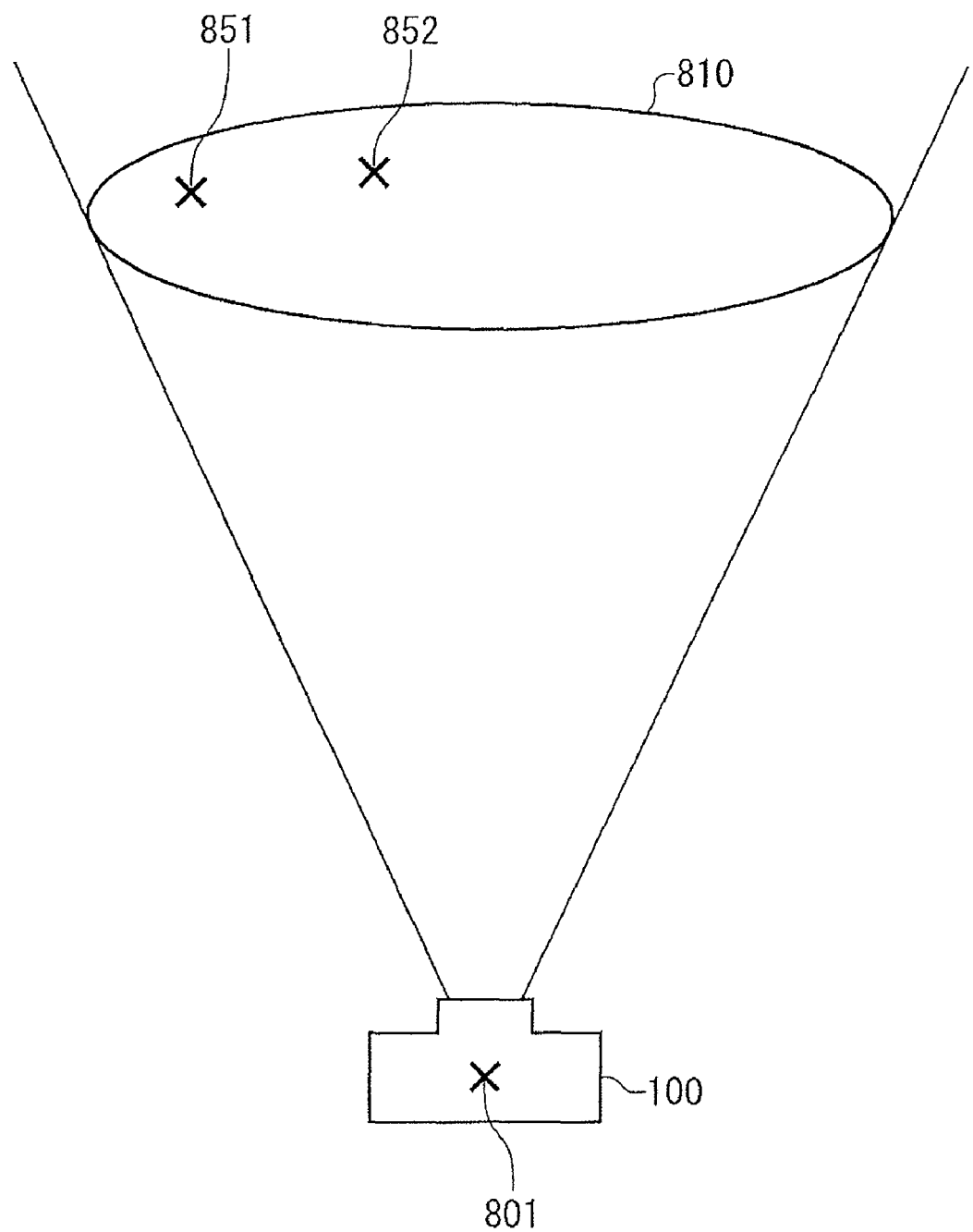
FIG. 8 shows an example of an image capturing range by the image capturing apparatus 100.

FIG. 8 shows an example of an image capturing range by the image capturing apparatus 100. The image capturing target area identifying section 240 identifies an image capturing target area 810 based on the image capturing position stored in the image capturing position storage section 262 and the image capturing condition stored in the image capturing condition storage section 280. For example, the image capturing target area identifying section 240 identifies the image capturing target area 810 positioned in the image capturing direction stored in the image capturing direction storage section 284 from an image capturing position 810 stored in the image capturing position storage section 262. Specifically, the image capturing area identifying section 240 calculates a depth of field in the distance from the image capturing position 801 to a focused subject based on the diaphragm. The focal distance and the image capturing position stored in the image capturing condition storage section 280. Then, the image capturing area identifying section 240 identifies the image capturing area 810 indicated by the depth of field surrounding the position of the subject focused in the image capturing direction stored in the image capturing condition storage section 280 based on the image capturing position 801. Then, the image capturing target area identifying section 240 identifies the image capturing target area 810 indicated by the depth of field surrounding the position of the subject focused in the image capturing direction stored in the image capturing condition storage section from the image capturing position 801.

Then, the important subject area judgment section 250 retrieves the position included in the identified image capturing target area 810 among the positions of the important subjects stored in the important subject position storage section 140. In FIG. 8, the important subject area judgment section 250 judges that positions 851 and 852 of the important subjects stored in the important subject position storage section 140 are included in the image capturing target area 810. Then, the position importance calculating section 266 calculates the total value of the importance stored in the important subject position storage section in association with the position of the important subject retrieved. Then, the position importance calculating section 266 calculates the total value of the importance by summing all images and adds the calculated total value of the importance to the importance of the image capturing position calculated based on the disproportion of the distribution of the image capturing position in the S302 of FIG. 3. Here, the position importance calculating section 266 may retrieve the position of the important subject stored in the important subject position storage section 140 in association with the period including the image capturing time stored in the image capturing time storage section 272 and the position included in the image capturing target area 810.

Figure 9:
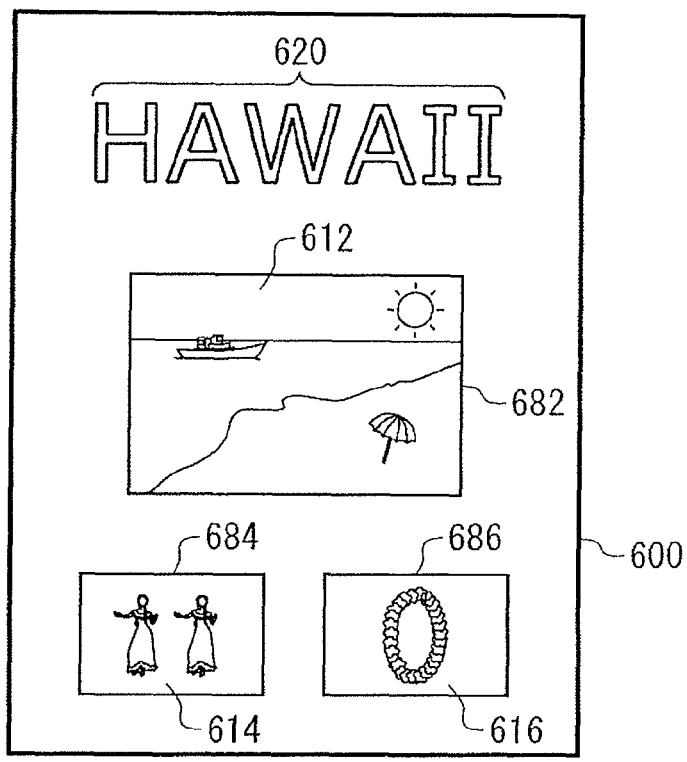
FIG. 9 shows an example of the layout result of images by the album creating apparatus 130.
Figure 9:
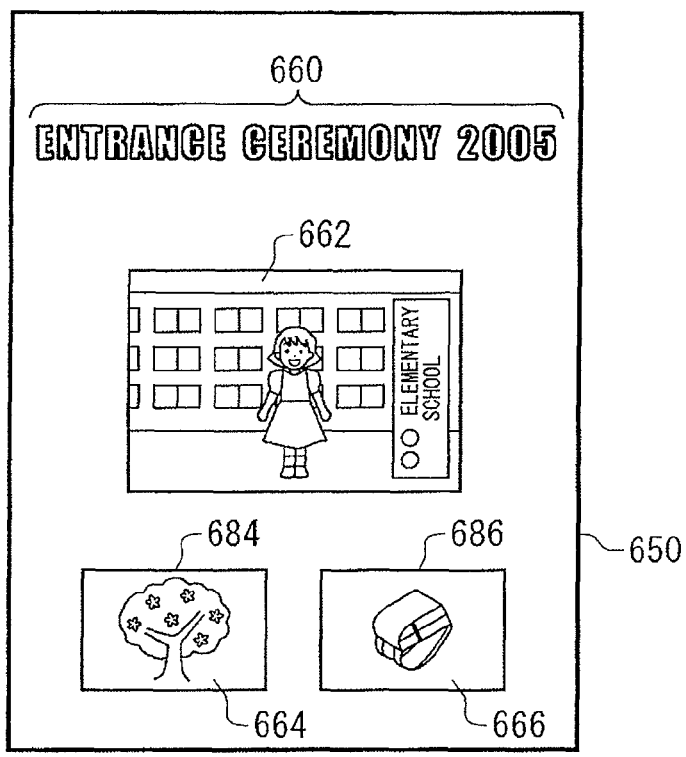

FIG. 9 shows an example of the layout result of images by the album creating apparatus 130. Specifically, FIG. 9 shows an example of a page 600 in which images area classified and laid out based on the distribution of the image capturing positions and an example of a page 650 in which images area classified and laid out based on the distribution of the image capturing times. Images 612, 614 and 616 classified into one page by the image classification section 260 are stored in the page 600. Then, the positional information inserting section 268 inserts a title 620 of the page. Meanwhile, images 662, 664 and 666 classified into one page by the image classification section 260 are stored in the page 650. Then, the positional information inserting section 268 inserts a title 660.

The album creating apparatus 130 may include a plurality of templates to define the layout of the images in the album. For example in FIG. 6, the album creating apparatus 130 stores a plurality of image frames 682, 684 and 686 of which position and size, into which each image is fitted as the template. Then, the layout determining section 270 may lay out images by fitting the images into each image frame.

Here, the positional information inserted by the positional information inserting section 268 may be character information indicative of the image capturing position such as a place name and also may be an image which identifies the region including the image capturing position such as an image of the national flag, an image of the building representative of the region and an outline map of the region. Additionally, the time information inserted by the time information inserting section 278 may be character information indicative of the image capturing time and also may be an image which identifies the image capturing time such as an image of the event representative of the age. Additionally, the positional information inserting section 268 may insert the positional information into each of a plurality of layout regions such as a title region into which the title is inserted in each of the plurality of pages in the album or a plurality of regions in one page in the album, and may insert the positional information into only one layout region such as an album title region into which the title of the album is inserted. In the same way, the time information inserting section 278 may insert the tome information into each of the plurality of layout regions in the album and also may be insert the time information into only one layout region. Here, the positional information inserting section 268 may insert the positional information when the importance of the image capturing position is higher than the importance of the image capturing time. Meanwhile, the time information inserting section 278 may insert the time information when the importance of the image capturing position is less than the importance of the image capturing time.

Additionally, the positional information inserting section 268 may judge the image capturing region including the image capturing position at which the image to be inserted into one layout region is captured and insert the positional information such as a term regarding the image capturing region. Additionally, the positional information inserting section 268 may store the positional information regarding the region including a position in association with the position. Then, the positional information inserting section 268 judges the image capturing region at which the image laid out by the layout determining section 279, selects the positional information stored in association with the position including the judged image capturing region and insert the selected positional information into the layout region. Additionally, the positional information inserting section 268 my store the positional information regarding the region including a position in association with the position.

Additionally, the time information inserting section 278 may judge an image capturing period including the image capturing time at which the image to be inserted into one layout region and insert the time information such as a term regarding the image capturing period. Additionally, the time information inserting section 278 may store the time information regarding the period including a time in association with the time. Then, the time information inserting section 278 may judge the image capturing period for which the image laid out by the layout determining section 270 is captured, select the time information stored in association with the time included the judged image capturing period and insert the selected time information into the layout region. Additionally, the time information inserting section 278 may store plural pieces of information regarding the period including a time in association with the time.

Here, the positional information inserting section 268 and/or the time information inserting section 278 may previously store each of the positional information and/or the time information, and also may receive each of the positional information and/or the time information through a recording medium such as a semiconductor memory and a CD-ROM and the communication line 150, for example.

The above-described album creating system 170 can appropriately classify images based on the image capturing position and/or the image capturing time. Then, the album creating apparatus 130 may insert an appropriate positional information and/or time information into each page classified into a page. Therefore, the user 180 can easily create an album with wide range of genre such as an album of the trip and an album to record the growth of a child using the album creating system 170.

Figure 10:
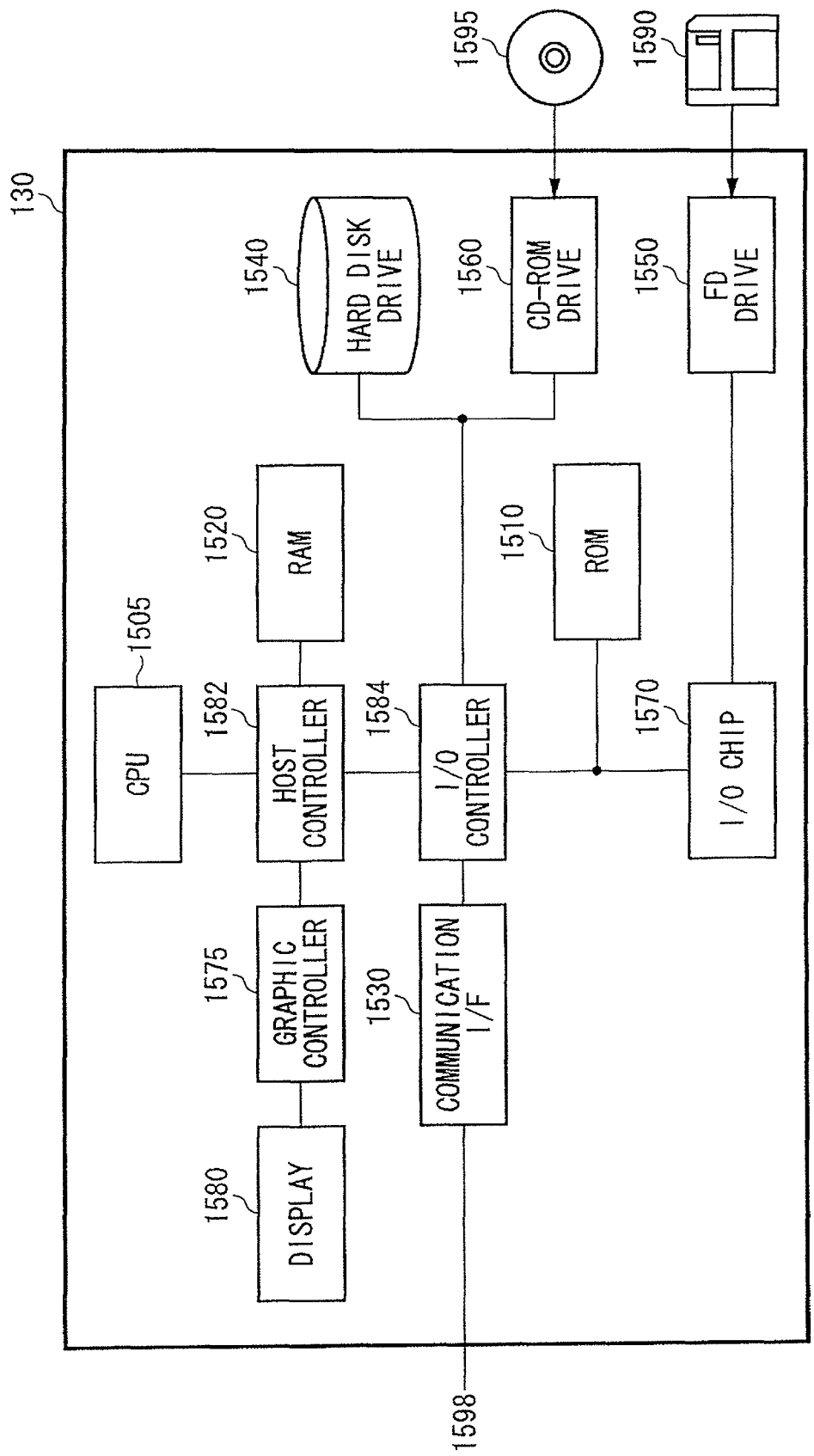
FIG. 10 shows an example of the hardware configuration of the album creating apparatus 130.

FIG. 10 shows an example of the hardware configuration of the album creating apparatus 130. The album creating apparatus 130 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The hard disk drive 1540 stores the program and data used by the CPU 1505. The communication interface 1530 connects a network communication device 1598 to transmit/receive the program and data. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 130 at activating and a program depending on the hardware of the album creating apparatus 130. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program executed by the CPU 1505 is stored in a recording medium, such as the flexible disk 1590, the CD-ROM 1595, or an IC card and provided by the user. The program stored in the recording medium may be compressed or not compressed. The program is installed from the recording medium to the hard disk drive 1540, read by the RAM 1520 and executed by the CPU 1505.

The program executed by the CPU 1505 operates the album creating apparatus 130 to function as the image storage section 204, the image classification section 260, the image capturing position storage section 262, the image capturing position distribution calculating section 264, the position importance calculating section 266, the position information inserting section 268, the layout determining section 270, the image capturing time storage section 272, the image capturing time distribution calculating section 274, the time importance calculating section 276, the time information inserting section 278, the output section 256, the image capturing condition storage section 280, the focal distance storage section 282, the image capturing direction storage section 284, the area dividing section 290 and the image capturing time judgment section 292 which are described with reference to FIG. 1-9. Additionally, the program operates the image capturing condition storage section 280 to function as the focal distance storage section 282 and the image capturing direction storage section 284 which are described with reference to FIG. 1-9. Further, the program operates the position importance calculating section 266 to function as the image capturing target area identifying section 240 and the important subject area judgment section 250 which are described with reference to FIG. 1-9.

The above-described programs may be stored in an external storage medium. The external recording medium may be, in addition to the flexible disk 1590 and the CD-ROM 1595, an optical storage medium such as a DVD and a PD, a magneto-optical recording medium such as a MD, a tape medium and a semiconductor memory such as an IC card. Additionally, a storage medium such as a hard disk or a RAM which is provided in the server system connected to a private communication network or Internet is used as the recording medium to provide the program to the album creating apparatus 130 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An album creating apparatus comprising:
    an image storage section provided in a storage device that stores a plurality of images;
    an image classification information storage section that stores an image classification information in association with each of the plurality of images stored in the image storage section, respectively;
    a classification information importance calculating section that calculates the importance of the image classification information in the plurality of images stored in the image storage section using a processor based on the image classification information of the plurality of images stored in the image classification information storage section;
    an image classification section that classifies the plurality of images stored in the image storage section based on the image classification information when the importance of the image classification information calculated by the classification information importance calculating section is higher than a predetermined reference value; and
    a layout determining section that lays out the images classified by the image classification section into an album, wherein the image classification information includes an image capturing geographic location.

2. The album creating apparatus according to claim 1 further comprising a geographic location information inserting section that inserts geographic location information indicative of the image capturing geographic location of the image laid out into the
    layout region in which the images are laid out by the layout determining section.

3. The album creating apparatus according to claim 2, wherein,
    the image classification section classifies the plurality of images stored in the image storage section into each page in the album based on the image capturing geographic location stored in the image classification information storage section,
    the layout determining section lays out the images classified into each page by the image classification section into each page in the album; and
    the geographic location information inserting section inserts the geographic location information indicative of the capturing geographic location of the image laid out in the page into which the image is laid out by the layout determining section.

4. The album creating apparatus according to claim 2 further comprising:
    an image capturing time storage section that stores the image capturing time in association with each of the plurality of images stored in the image storage section, respectively;
    a time importance calculating section that calculates the importance of the image capturing time of the plurality of images stored in the image storage section based on the image capturing times of the plurality of images stored in the image capturing time storage section; and
    a time information inserting section that inserts the time information indicative of the image capturing time of the image laid out into the layout region into which the image is laid out by the layout determining section, wherein
    the image classification section classifies the plurality of images stored in the image storage section further based on the image capturing time when the importance of the image capturing time calculated by the time importance calculating section is higher than a predetermined reference value,
    the time information inserting section further inserts the time information indicative of the capturing time of the image laid out into the layout region into which the image is laid out by the layout determining section.

5. The album creating apparatus according to claim 1 further comprising an image capturing geographic location distribution calculating section that calculates an image capturing geographic location distribution of the plurality of images stored in
    the image storage section based on the image capturing geographic locations of the plurality of images stored in the image classification information storage section,
    wherein the classification information importance calculating section calculates the importance of the image capturing geographic locations in the plurality of images stored in the image storage section based on the image capturing geographic location calculated by the image capturing geographic location distribution calculating section.

6. The album creating apparatus according to claim 5, wherein the classification information importance calculating section calculates the importance higher when the image capturing geographic location distribution calculated by the image capturing geographic location distribution calculating section is unbalanced in two or more image capturing geographic locations and when the distance between the concentrated image capturing geographic locations is larger.

7. The album creating apparatus according to claim 1 further comprising:
    a focal distance storage section that stores the focal distance at which the image is captured in association with each of the plurality of images stored in the image storage section, respectively; an image capturing target area identifying section that identifies an image capturing target area for each of the plurality of images stored in the image classification information storage section based on the plurality of image capturing geographic locations stored in the image classification information storage section and the focal distances of the plurality of images stored in the image classification information storage section; an important subject geographic location storage section that stores the geographic location of the important subject previously registered as the image capturing target; and an important subject area judgment section that judges whether the image capturing target area identified by the image capturing target area identifying section includes the geographic location of the important subject stored in the important subject geographic location storage section wherein the classification information importance calculating section calculates higher the importance of the image capturing geographic location of the plurality of images stored in the image storage section when the image storage section stores more images judged by the important subject area judgment section as the image capturing area includes the geographic location of the important subject.

8. The album creating apparatus according to claim 7 further comprising an image capturing direction storage section that stores the image capturing direction in association with each of the plurality of images stored in the image storage section, respectively, wherein the image capturing target area identifying section identifies the image capturing target area for each of the plurality of images stored in the image classification information storage section further based on the image capturing directions of the plurality of images stored in the image capturing direction storage section.

9. The album creating apparatus according to claim 7 further comprising an image capturing time storage section that stores the image capturing time in association with each of the plurality of images stored in the image storage section, wherein the important subject geographic location storage section stores the geographic location of the important subject in association with a period, the important subject area judgment section judges whether the image capturing target area identified by the image capturing target area identifying section includes the geographic location of the important subject stored in the important subject geographic location storage section in association with the period including the capturing time of the image stored in the image capturing time storage section, and the classification information importance calculating section calculates higher the importance of the image capturing geographic locations of the plurality of images stored in the image storage section when the image storage section stores more images judged by the important subject area judgment section as that the images include the geographic location of the important subject.

10. The album creating apparatus according to claim 1 further comprising:

an area dividing section that divides the image capturing range for the plurality of images stored in the image storage section into a plurality of areas based on the image capturing geographic locations of the plurality of images stored in the image capturing classification information section; an image capturing time storage section that stores the image capturing time in association with each of the plurality of images stored in the image storage section; and an image capturing time judgment section that judges whether the image storage section stores the image captured in a second area divided by the area dividing section at a time in the period for which the plurality of images are captured in a first area divided by the area dividing section based on the image capturing geographic locations of the plurality of images stored in the image classification information storage section and the capturing times of the plurality of images stored in the image capturing time storage section, wherein the classification information importance calculating section calculates lower the importance of the image capturing geographic locations of the plurality of images stored in the image classification information storage section when the image capturing time judgment section judges that the image storage section stores the image captured in the second area at the time in the period for which the plurality of images are captured in the first area.

11. The album creating apparatus according to claim 1, wherein the image classification information includes an image capturing time.

12. The album creating apparatus according to claim 1, wherein the image classification section classifies the plurality of images by separating the images into groups which comprise a plurality of images;

wherein the album comprises a plurality of layout regions; and wherein the layout determining section lays out each of the groups of images into a different layout region, respectively.

13. The album creating apparatus according to claim 1, wherein the image classification section does not classify the plurality of images based on the image classification information when the importance of the image classification information is not higher than the predetermined reference value.

14. An album creating method comprising: storing a plurality of images in a storage device; storing image classification information in association with each of the plurality of images stored in the image storing step, respectively;

calculating the importance of the image classification information in the plurality of images stored in the image storing step using a processor based on the image classification information of the plurality of images stored in the image classification information storing step; classifying the plurality of images stored in the image storing step based on the image classification information when the importance of the image classification information calculated in the classification information importance calculating step is higher than a predetermined reference value; and laying out the images classified in the image classifying step into an album, wherein the image classification information includes an image capturing geographic location.

15. The album creating method according to claim 14, wherein the image classification information includes an image capturing time.

16. The album creating method according to claim 14, wherein the plurality of images are classified by being separated into groups which comprise a plurality of images;

wherein the album comprises a plurality of layout regions; and wherein each of the groups of images are laid out into a different layout region, respectively.

17. The album creating method according to claim 14, further comprising determining whether the importance of the image classification information is higher than the predetermined reference value.

18. A non-transitory computer readable medium storing thereon a program executable to implement an image creating apparatus for creating an album, the program operating the album creating apparatus to function as: an image storage section that stores a plurality of images; an image classification information storage section that stores an image classification information in association with each of the plurality of images stored in the image storage section, respectively; a classification information importance calculating section that calculates the importance of the image classification information in the plurality of images stored in the image storage section based on the image classification information of the plurality of images stored in the image classification information storage section; an image classification section that classifies the plurality of images stored in the image storage section based on the image classification information when the importance of the image classification information calculated by the classification information importance calculating section is higher than a predetermined reference value; and a layout determining section that lays out the images classified by the image classification section into an album, wherein the image classification information includes an image capturing geographic location.

19. The computer readable medium according to claim 18, wherein the image classification information includes an image capturing time.

20. The computer readable medium according to claim 18, wherein the image classification section classifies the plurality of images by separating the images into groups which comprise a plurality of images;

wherein the album comprises a plurality of layout regions; and wherein the layout determining section lays out each of the groups of images into a different layout region, respectively.

21. The computer readable medium according to claim 18, wherein the image classification section does not classify the plurality of images based on the image classification information when the importance of the image classification information is not higher than the predetermined reference value.

22. An album creating apparatus comprising:

an image storage section provided in a storage device that stores a plurality of images;

an image classification information storage section that stores image classification information which comprises a plurality of types of image classification information in association with each of the plurality of images, respectively;

a classification information importance calculating section that calculates the importance of each of the types of image classification information using a processor based on the image classification information; an image classification section that classifies the plurality of images based on the image classification information which corresponds to the type of image classification information that has the highest importance while not classifying the plurality of images based on the image classification information which corresponds to the type or types of image classification information that does not have the highest importance; and a layout determining section that lays out the images classified by the image classification section into an album, wherein one of the types of image classification information is an image capturing geographic location.

23. The album creating apparatus according to claim 22, wherein the image classification section classifies the plurality of images by separating the images into groups which comprise a plurality of images;

wherein the album comprises a plurality of layout regions; and wherein the layout determining section lays out each of the groups of images into a different layout region, respectively.

\* \* \* \* \*